DATA COMMUNICATION SYSTEM

Filed Sept. 19, 1960 2 Sheets-Sheet 1

INVENTOR.
WILBUR E. DU VALL

BY Lyon & Lyon

ATTORNEYS

April 30, 1963 W. E. DU VALL 3,088,099

DATA COMMUNICATION SYSTEM

Filed Sept. 19, 1960 2 Sheets-Sheet 2

INVENTOR.
WILBUR E. DU VALL

BY Lyon & Lyon

ATTORNEYS 3,088,099

DATA COMMUNICATION SYSTEM

Wilbur E. Du Vall, Gardena, Calif., assignor to The W. W. Henry Company, Huntington Park, Calif., a corporation of California Filed Sept. 19, 1960, Ser. No. 57,010
7 Claims. (Cl. 340—167)

This invention relates to data-transmission systems and, more particularly, to improvements therein A principal object of this invention is to reduce the bandwidth required for data signal transmission.

Another principal object of this invention is to insure that the data received is identical to the data transmitted despite the presence of noise in the transmission channel.

Yet another object of the present invention is to provide a novel and improved data-transmission system.

Still another object of this invention is to provide an improved data-transmission system which is simpler to manufacture than presently known systems.

Still another object of the present invention is to provide a simple, accurate, and inexpensive data-transmission system.

These and other objects of the invention may be achieved in a system wherein data is transmitted as a sine-wave carrier with binary significance. The carrier is present during the transmission of both binary digits. At the receiver, means are provided for deriving from the received signal an accurate clock or gating pulse whereby one may accurately derive from the received sine wave the information conveyed thereby from the transmitter.

The novel features that are considered characteristic of this invention are set forth with particularity in the appended claims. The invention itself, both as to its organization and method of operation, as well as additional objects and advantages thereof, will best be understood from the accompanying description when read in connection with the accompanying drawings, in which:

Figure 1:
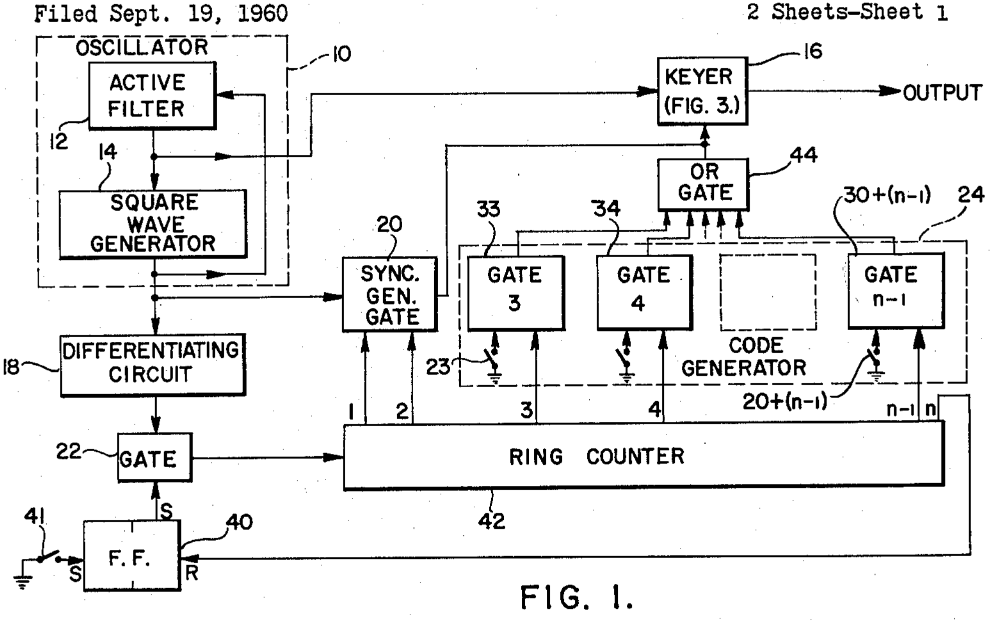
FIGURE 1 is a block diagram of a transmitter in accordance with this invention.
Figure 2:
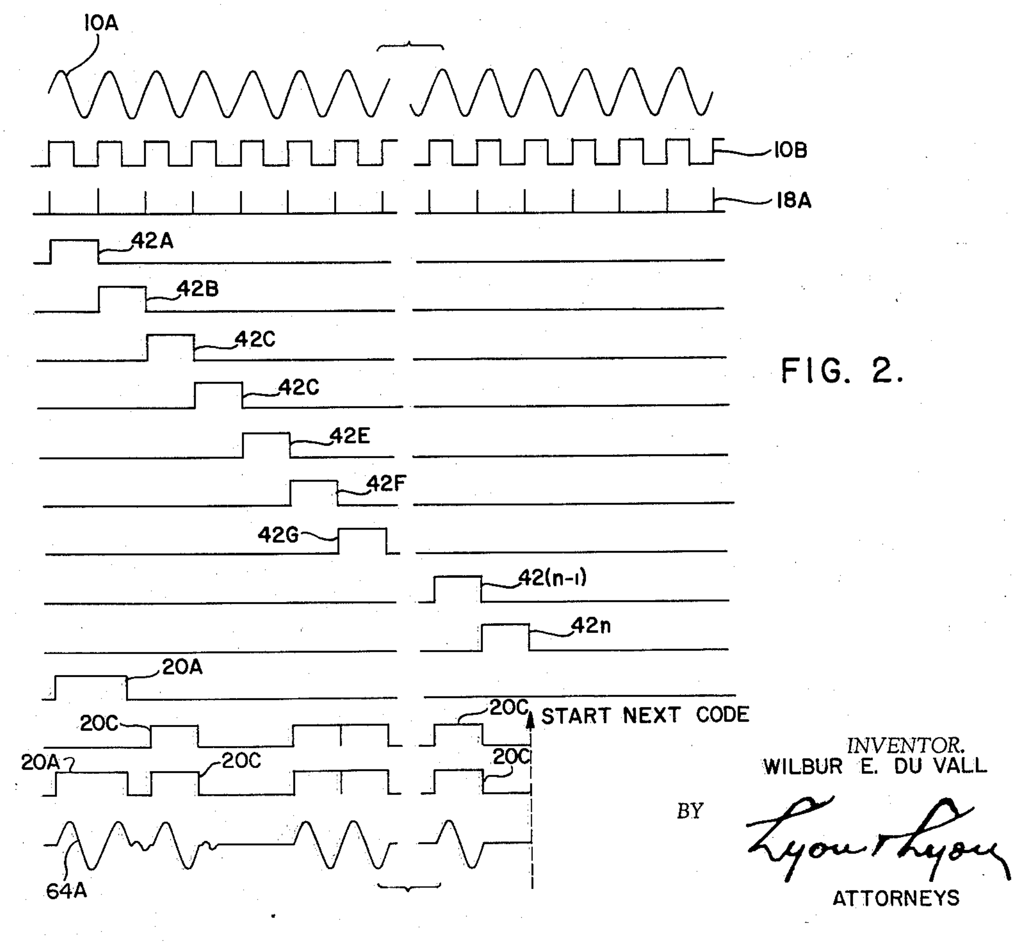
FIGURE 2 is a wave shape diagram, shown to assist in an understanding of the operation of the transmitter.

Reference is now made to FIGURE 1, which is a block diagram for a transmitter in accordance with this invention, and to FIGURE 2, which consists of wave shapes derived from the circuits represented by blocks in FIGURE 1. In accordance with the previous brief description, this data-transmission system employs a sine-wave carrier for data transmission. A "one" binary bit may be represented by a single sine-wave cycle having one amplitude and a "zero" binary bit may be represented by another single sine-wave cycle of another amplitude. For purposes of illustration, assume that a one binary bit is represented by a sine wave which is 30 db greater than a zero binary bit.

Figure 3:
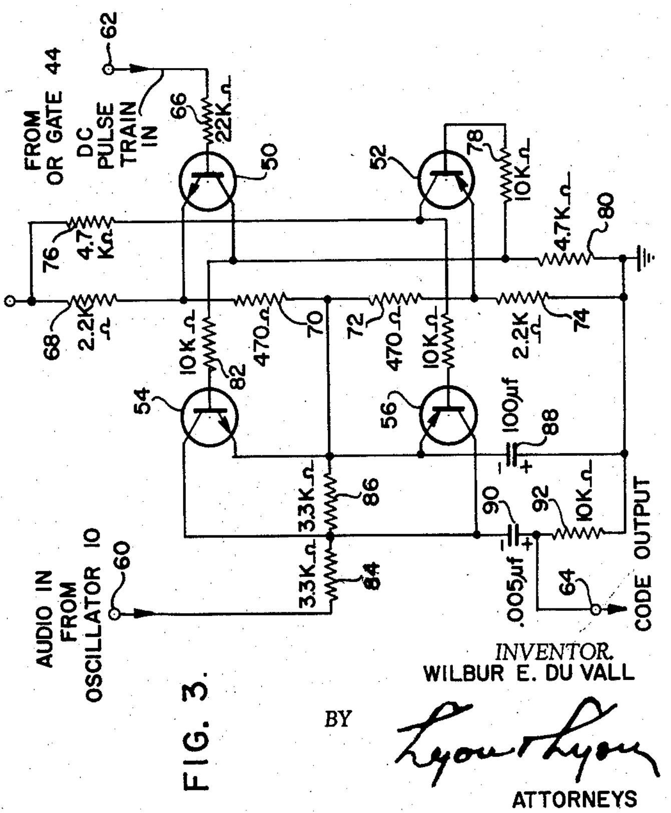
FIGURE 3 is a circuit diagram of a keyer which is employed in the transmitter.

In the diagram, an oscillator is represented by the dotted rectangle bearing the reference numeral 10. This includes an active filter 12, or high-gain amplifier with circuits tuned to the desired frequency of operation, and a square-wave generator 14. The square-wave generator output is applied ot the active filter input. The output of the active filter, consisting of a sine wave at the tuned frequency, in turn, drives the square-wave generator. Thus, it is possible to obtain both a sine-wave output, as represented by 10A in FIGURE 2, and a square-wave output, as represented by 10B in FIGURE 2, from the oscillator 10. The sine-wave output of the oscillator is applied to a keyer 16, the details of which are shown in FIGURE 3. The square-wave output of the oscillator is applied to differentiating circuit 18 and to a sync generator gate 20. The differentiating circuit 18 is used to select the leading edge of each pulse, as represented by the wave shape 18A. The output of the differentiating circuit is applied to a gate 22. The gate 22 is closed until it is desired to generate and transmit a code. The code desired to be transmitted is established by a code generator 24. This code generator 24 may comprise a plurality of switches 23, 24 . . . 20+($n$—1), which exemplify any type of device for priming or enabling selectively a plurality of gates 33, 34 . . . 30+($n$—1). For example, these may be mechanical switches, electronic flip-flops which are selectively established in a set condition in response to other devices, such as magnetic tape. In summary, therefore, the code generator comprises a device for selectively enabling the gates 33, 34 . . . 30+($n$—1) for representing a code character desired to be transmitted.

Accordingly, at the outset, the code generator is operated to control the gates so that they are primed in a pattern representative of the code desired to be transmitted. A flip-flop 40 is driven from its reset to its set state by operating a momentary start switch 41. This switch may be included in the code generator in well-known fashion, to be automatically energized when the code desired to be transmitted has been completely established in the code generator 24. Flip-flop 40, when in its set condition, enables gate 22 to pass pulses. The output of gate 22 is connected to the input to a ring counter 42. Thus, the pulses 18A drive the ring counter 42. This ring counter has the number of count stages thereof determined by the number of binary bits in the code to be transmitted. Thus, the outputs from the third to the $n$—1 counter stages are applied to the inputs of the respective gates 33 through 30+($n$—1), which may be selectively primed to pass these outputs by keys 23 through 20+($n$—1). The first two stages of the counter have their outputs connected to a sync generator gate 20. The sync generator gate 20 has another input connected to the oscillator 10 to receive square-wave pulses. It thus is enabled to pass two of these pulses during the first two counts of the counter. The wave shapes 42A—42N in FIGURE 2 represent the count outputs of the counter 42. The wave shape 20A represents the sync generator gate output which is applied to the keyer 16.

The ring counter will count through a complete cycle in response to the output of the oscillator 10, which is applied through gate 22. The first two count outputs of the ring counter are applied to the sync generator gate for indicating the commencement of a code train. The subsequent outputs of the ring counter are applied or not to an OR gate circuit 44, as determined by the enabled condition of the respective gates 33 through 30(n—1) in response to the output of the code generator 24. Thus, for each enabled gate, a pulse having the duration of a cycle of oscillation is applied to the keyer 16. The keyer 16, as will be described in more detail hereinafter, will transmit oscillations from the oscillator in a manner to represent the code established in the code generator 24.

At the termination of the count, or upon attaining its last or $n$th count state, counter 42 drives the flip-flop 40 to its reset condition, at which time gate 22 is no longer enabled. Ring counter 42, as a result, will terminate its counting operation and be in condition for the next code word transmission. In FIGURE 2, the output of OR gate 44 to the keyer comprises the sync pulse 20A, followed by the pulses exemplified by 20C, which are the output pulse from the OR gate 44.

Reference is now made to FIGURE 3, which shows a circuit diagram of the keyer 16. Briefly, this keyer comprises four transistors 50, 52, 54, 56 and their associated circuitry. Transistors 54 and 56 are conducting fully in saturation in the absence of an input to transistor 50. Transistor 50 functions in response to an input from OR gate 44 to render transistors 54 and 56 nonconductive. At the termination of an input to transistor 50 from the OR gate 44, then transistors 54 and 56 are rendered fully conducting again.

The sine-wave input from oscillator 10 is applied to a terminal 60. The input from OR gate 44 is applied to a terminal 62. Output from the keyer is derived from an output terminal 64. The base of transistor 50 is connected through a resistor 66 to terminal 62. The emitter of the transistor 50 is connected to a series of resistors 68, 70, 72, 74, which are connected across the operating potential source for the transistors. Transistor 50 is of the NPN type. Its input, in the absence of output from OR gate 44, is −12 volts, which holds this transistor nonconductive. The input from OR gate 44 is a positive pulse, which in an embodiment of the invention rises from −12 to −3 volts, which renders transistor 50 conductive.

Transistor 52 is a PNP transistor. Its collector is connected through a resistor 76 to the negative terminal of the operating potential supply. Its base is connected through a resistor 78 and a second resistor 80 to ground. Its emitter is connected between resistors 72 and 74. When transistor 50 is rendered conductive, current flowing through its collector makes the base of transistor 52 more negative than its emitter, whereby it is rendered conductive.

Transistor 54, which is an NPN transistor, has its base connected through a resistor 82 to the collector of transistor 50 and to the junction of resistors 78 and 80. The emitter of transistor 54 is connected between resistors 70 and 72, and the collector of transistor 54 is connected through a resistor 84 to the oscillator input terminal 60. When transistor 50 is rendered conductive, its collector current raises the base of transistor 54 to a sufficiently high negative potential to drive the transistor out of saturation.

Transistor 56 has its collector connected to the collector of transistor 54 and its emitter connected to the emitter of transistor 54. Transistor 56 is a PNP type transistor. The base of transistor 56 is connected to the collector of transistor 52. Thus, when transitor 52 is rendered conductive, it pulls the base of transistor 56 more positive with respect to its emitter sufficiently to drive transistor 56 out of saturation.

It should be noted that transistors 54 and 56 have their respective emitters and collectors connected to the opposite ends of a resistor 86. Resistor 86 is connected in series with resistor 84. A large value capacitor 88 is connected between the end of resistor 86, to which the emitters of transistors 54 and 56 are connected, and ground. The junction of resistors 84 and 86 is connected through a small-value capacitor 90 to the code output terminal 64. In addition, capacitor 90 is connected to ground through a resistor 92.

The input to terminal 60, consisting of sine waves, is principally developed across a voltage divider comprising resistor 84 in series with resistor 86. Capacitor 88 has a large value, whereby its impedance is effectively only a few ohms. Thus, when transistors 54 and 56 are not conducting, the amplitude of the code output at terminal 64 is determined effectively by the ratio of resistors 84 and 86 in series. Capacitor 90 serves to remove the D.-C. level from the output signal which is applied to output terminal 64. Resistor 92 has a high value and merely provides a D.-C. charge path for capacitor 90. When transistors 54 and 56 are rendered conductive in saturation, they shunt resistor 86 so that the output at terminal 64 is effectively determined by the values of resistor 84 in series with resistor 86. In an embodiment of the invention which was built, these shunt transistors had a value, when conductive, on the order of 15 ohms, thus effectively short-circuiting resistor 86. The values of these components used for an embodiment of this invention are shown in the drawings. An attenuation of the output is obtained with these components on the order of 30 db. Thus, in the presence of an input from OR gate 44, a sine wave appears at terminal 64 which is 30 db greater than the sine wave which will appear in the absence of an input from OR gate 44.

In FIGURE 2, the combination of waves 20A and 20C is shown. This comprises the output of OR gate 44, which is applied to terminal 64 in FIGURE 3. The wave shape 64A represents the output which appears at terminal 64 in response to such input. To summarize the operation of the keyer, in the presence of an input from OR gate 44, transistors 54 and 56 are not conductive and transistors 50 and 52 are conductive, with the result that a sine wave appears at terminal 64 having an amplitude which is large relative to the amplitude of the sine wave appearing at that terminal in the absence of an input pulse from OR gate 44. This is achieved by rendering transistors 54 and 56 nonconductive in response to the OR gate input, whereby the shunt across resistor 86 is removed.

The output from terminal 64 may be transmitted on lines, or may be radiated, or may be applied directly to magnetic tape for recording. It should be noted here that the values shown for the components in FIGURE 3 are to be considered as exemplary and not as a limitation on this invention.

A further fact to be noted at this time is that the system of transmission which has just been described employs a single complete sine-wave cycle to represent a binary bit, or two half-cycles per bit. There is absolutely no time jitter with the arrangement described, since the same oscillator which generates the sine wave is employed to select two half-cycles from that sine wave for representing a binary bit. This should not be construed as a limitation upon the invention, since, if desired, more than two half-cycles of a sine wave may be employed for representing a binary bit and indeed by employing the leading as well as the trailing edge of the pulses 10B for advancing the ring counter 42, this inventor has been able to employ half sine-wave cycles for representing a binary bit while eliminating time jitter. Time jitter can cause errors to creep into the detection of the code transmitted at the receiver.

A coherent product type of detector may be used for detecting the code which has been transmitted. However, it is preferred to employ as a receiver a circuit which takes advantage of the fact that the carrier on which the information is modulated as amplitude variations thereof is always transmitted and thus is available for employment in effectively strobing the incoming signal at the optimum time to determine what binary bit has been transmitted at that time. Thus, effectively, it may be stated that with this mode of transmission the information is locked to the carrier and with the proper type of receiver the information can be removed despite the presence of extremely high noise levels. Since the information is transmitted as one or the other of two levels at the sine wave, the minimum bandwidth for a given bit rate has been hereby achieved.

Figure 4:
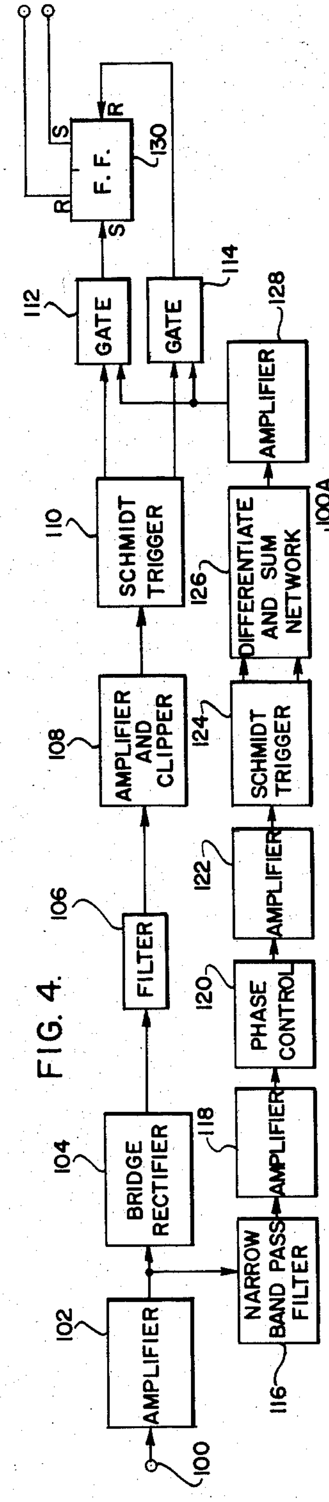
FIGURE 4 is a block diagram of a receiver which may be used for receiving and decoding the signals sent out by the transmitter shown in FIGURE 1.

In an application by this inventor, filed April 26, 1960, Patent No. 3,028,556, and entitled, Frequency Selective Audio Receiver, there has been described a receiver suitable for decoding a transmission of the type described herein, which takes advantage of the presence of the carrier at all times for strobing the incoming signal. FIGURE 4 shows a block diagram of a preferred arrangement for an audio receiver which fully utilizes the information being transmitted to derive the code information being transmitted. In this receiver, the transmitted signal is amplified and then sent into two chanels. The upper channel is employed for the recovery of the binary bits modulated on the incoming signal, and the lower channel is used for clocking the binary bits for the purpose of regenerating the waveform.

The output of the keyer 16, which has been described in detail on FIGURE 3, is applied to the input terminal 100, shown in FIGURE 4. Terminal 100 is connected to an amplifier 102, which serves the purpose of amplifying the signal received from terminal 100. The output of the amplifier 102 is connected to a bridge rectifier 104. This serves to rectify the signals received from the amplifier. Attention at this time is called to FIGURE 5, which shows wave shapes which occur in various portions of the receiver shown in FIGURE 4. Thus, wave shape 100A represents a typical transmission which is received on terminal 100 from the keyer. The binary bits represented by this wave shape are indicated below it. This wave shape represents a sync pulse, followed by the characters 1—0—0—1—1—1—0—1.

Figure 5:
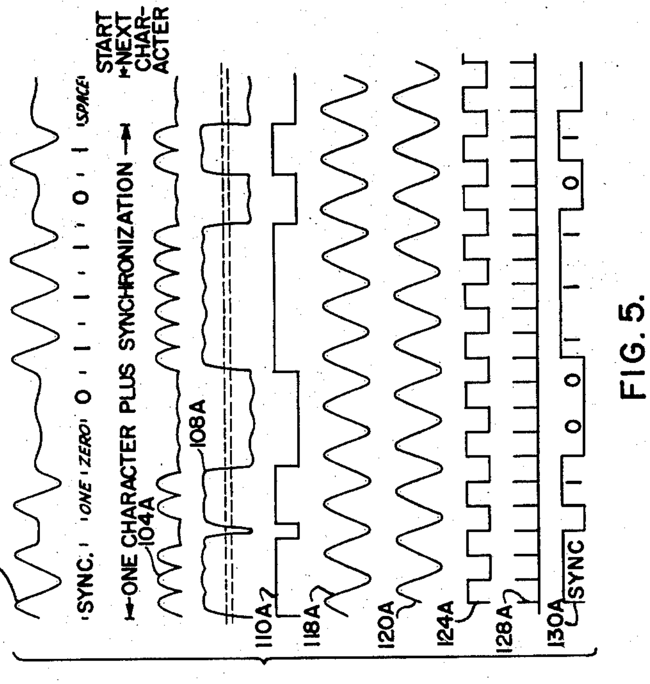
FIG. 5 shows wave shapes of FIG. 4.

Wave shape 104A represents the output of the bridge rectifier in response to wave shape 100A. The output of the bridge rectifier 104 is applied to an audio filter 106. The output of the filter 106 is applied to an amplifier and clipper circuit 108. The wave shape at the output of amplifier and clipper 108 is represented by 108A in FIGURE 5. The dotted lines indicate the triggering level of a Schmitt trigger circuit 110, to which the output of the amplifier and clipper 108 is applied. The Schmitt trigger circuit will be driven to one or the other of its two states, respectively designated by the set and reset states, as determined by whether or not the output of the amplifier and clipper exceeds the switching level of the circuits. In FIGURE 5 the wave shape 110A represents the output of the Schmitt trigger circuit in response to the wave shape represented by 108A. The set output of Schmitt trigger 110 is applied to a gate 112. The output of this Schmitt trigger 110 substantially represents the binary code initially transmitted. However, it will contain width distortion (ones and zeros not the same width as the generated code). Regeneration of this signal requires accurate clock pulses which are recovered by the clock channel circuitry.

The output of amplifier 102, which effectively is represented by the signals 100A in FIGURE 5, is applied to a narrow bandpass filter 116. This filter serves the function of separating the clock signal from the binary code modulation on the carrier. The output of the narrow bandpass filter 116 is applied to an amplifier 118. The output of the amplifier 118 is the clock signal represented by the wave shape 118A in FIGURE 5. This is a continuous sine-wave signal and it is fed to a phase-control network 120, which is employed to correct for any phase shift occasioned in the transmission of the signals, as well as in the circuitry at the receiver. The output of the phase-control network 120 is represented by the phase-corrected signal 120A in FIGURE 5.

The sine-wave clock signal at the output of the phase-control network 120 is applied to an amplifier 122 and thereafter to a Schmitt trigger circuit 124. The Schmitt trigger circuit serves to square the sine-wave signals applied to its input. The outputs from the Schmitt trigger circuit are differentiated, clipped, and summed in a network 126, and thereafter amplified in an amplifier 128. The output of the amplifier 128 consists of the extremely narrow pulses represented by the wave shapes 128A in FIGURE 5. These narrow pulses occur at the leading and trailing edge of each one of the square pulses 124A derived from the Schmitt trigger 124. These pulses are positioned to occur by the phase-control network 120 at a time within the incoming code signal 100A when this code signal will have its optimum value. Effectively, this is within the peak regions of the transmitted modulated sine wave.

The clock pulses 128A are applied to both gates 112 and 114. The outputs of the respective gates 112 and 114 are respectively applied to the set and reset input terminals of a flip-flop circuit 130. The one of the two gates 112, 114 which is opened at the time the clock pulse is applied to their inputs is determined by whether or not the Schmitt trigger circuit 110 is in its set or reset state. By regarding wave shapes 110A and 128A, it will be seen that flip-flop 130 is driven to its set state during the sync pulse and will remain in such set state over the one and one-half cycle interval of the sync pulse. This sync pulse, which is regenerated by the flip-flop 130, starts within half a cycle of the received sync-pulse signal on the terminal 100 and terminates within half a cycle after the received sync pulse has terminated. Thereafter, flip-flop 130 is driven to its reset condition, where it remains for half a cycle of the received signal on terminal 100. Thereafter, flip-flop 130 is driven to its set condition again, in which state it remains for the duration of the sine-wave cycle on the incoming signal which represents a one binary bit. Flip-flop 130 is then driven in response to gate 114 output to the reset state, where it remains for the duration of two sine-wave cycles representative of two zeros in succession.

Wave shape 130A on FIGURE 5 represents the regenerated code train. This code train exactly represents the code which was sent out at the transmitter. The clock pulses from the amplifier 128 effectively strobe the gates 112 and 114 once each half-cycle for about a microsecond. The operation of the system in the manner described results in the regenerated code being time-jitter free, having a standard amplitude, and being identical with the signal transmitted, despite the presence of any noise in the transmission channel. The one or zero modulation on the sine-wave carrier need be present only for about a microsecond at the time the clock pulse from amplifier 128 is applied to the gates 112, 114, in order to completely regenerate a noise and jitter-free code train.

It is of interest to note that in addition to being suitable for transmission of a maximum of information over a narrow-band transmission channel, such as telephone lines and the like, the present invention may be employed for packing more data onto magnetic tape, for example, than has been hitherto thought possible. As was previously pointed out, the output of the keyer may be recorded directly on magnetic tape. The receiver described in FIGURE 4 is employed to read the information which has been recorded on magnetic tape. Employing this technique, this inventor has been able to record, for example, 1750 bits of information on an inch of magnetic tape operating at a speed of three and three-quarter inches per second. The tape recorder employed was of the usual home variety type. A recovery of the recorded data operating the tape recorder at the recording speed was completely error free. This figure is by way of exemplification. By employing this invention for the recording and reading data on tape, it is theoretically possible to pack in one inch of tape a number of bits equal to twice the sine-wave carrier frequency employed where the tape recorder has a sufficiently wide recording bandwidth.

The circuits represented by the block diagrams herein are all well known to those skilled in the art. Furthermore, those skilled in the art will have no trouble in interconnecting these circuits to operate in the manner which has been described in the foregoing specification. By way of example, and not to serve as a limitation, suitable gate circuits which may be used for the gates 22, 20, 33, 34, 30+$N$—1 are described and shown in the publication, "A Handbook of Selected Semiconductor Circuits," NOBSR 73231, prepared by Transistor Applications, Inc., for Bureau of Ships, Department of the Navy. See page 7–1, et seq., and circuits shown on page 7–2. Also shown there is the circuitry for a suitable OR gate 44.

Ring counter circuits are shown on pages 7–32 and 7–33 of this publication, which are suitable for use in the embodiment of the invention. A flip-flop circuit may be employed as the square-wave generator 14 in FIGURE 1 and a suitable circuit is shown on page 6–17 of this publication. This circuit may also be used as the flip-flop 40 in FIGURE 1 and the flip-flop 130 in FIGURE 4. A differentiating circuit which may be used for the differentiating circuit 18 is shown on page 78 of the publication "Electronics," by Elmore and Sands, published by the McGraw-Hill Book Company in 1949. The active filter circuit 12, which was employed in the embodiment of the invention, is exemplified in "Electronics," published by the McGraw-Hill Book Company, on May 8, 1959, in the article entitled "Transistorized 1300 CPS Bandpass Filter for Dual Conversion Marker Beacon Receiver."

There has accordingly been described and shown herein a novel and useful system for transmitting data and recovering same wherein the problem of time jitter of the transmitted data is eliminated, the problems of noise in the transmission channel are minimized, and a minimum of bandwidth is required for either transmitting or recording information. The data is transmitted in a manner to be locked both in phase and duration to the carrier. The carrier is sufficiently transmitted at all times so that an accurate clock pulse may be derived therefrom for detecting the data from the carrier.

I claim:

1. A data-transmission system comprising means for generating a binary-code carrier signal having a sine wave shape wherein the binary bits of said code occur with a fixed phase and duration and wherein said binary bits are represented by one or the other of two different amplitudes of said carrier signal, means for transmitting said binary-code carrier signal, means for receiving said binary-code carrier signal, means for deriving clock pulses from said received binary-code carrier signal, means for deriving pulses from those portions of said received binary-code carrier which exceed a predetermined amplitude, a gate circuit, and means for applying said derived pulses and said clock pulses to said gate circuit to obtain an output therefrom only in the presence of both pulses.

2. A binary data-transmission system comprising an oscillation generator having means for generating a carrier wave having a sine-wave shape, means for deriving from said oscillation generator a pulse train representative of a desired binary code wherein each pulse and the spacing between pulses has a duration fixedly related to the duration and phase of a cycle of said sine-wave shape, and means to which said carrier wave and said pulse train are applied for translating said carrier wave at one amplitude responsive to the presence of a pulse in said wave train and at another amplitude during the interval between pulses.

3. Apparatus for transmitting binary data bits comprising an oscillation generator having means for generating a carrier wave having a sine-wave shape, means for establishing a physical representation of a binary code desired to be transmitted, means to which output from said oscillation generator is applied and to which said means for establishing a physical representation is connected, for generating a pulse train representative of said binary code wherein each pulse and the spacing between pulses has a duration and phase fixedly related to that of a cycle of the sine-wave shape of said carrier wave, and means to which said carrier wave and said pulse train are applied for transmitting said carrier at one amplitude during a pulse and at a different amplitude during the interval between pulses.

4. Apparatus for transmitting binary data bits comprising an oscillation generator having means for generating a carrier wave having a sine-wave shape, means to which said oscillation generator output is applied for generating a train of pulses each having a duration and phase fixedly related to that of a cycle of said sine-wave shapes, means for deriving a desired binary code representation from said train of pulses wherein binary bits are represented by the presence or absence of pulses in a train, and means to which said carrier wave and said binary code representation are applied for transmitting said carrier at one amplitude during a pulse and at a different amplitude during the interval between pulses.

5. Apparatus for transmitting binary data bits comprising an oscillation generator having means for generating a carrier wave having a sine-wave shape, a cyclic counter providing an output pulse for each different count state, means for applying output from said oscillation generator to said counter for advancing the count state thereof, means for selecting output pulses from preselected ones of said counter count states for representing a desired binary code, and a keyer circuit to which said carrier wave and said selected output pulses are applied, said keyer circuit including means for emitting said carrier wave at one amplitude in the presence of said selected output pulses and a second amplitude in the absence of said selected output pulses.

6. Apparatus for transmitting binary data bits as recited in claim 5 wherein said oscillation generator includes means for generating square waves, and means for deriving said carrier wave from said square waves, said means for applying oscillations from said oscillation generator to said counter includes means to which said square waves are applied for deriving pulses from the leading edges of said square waves, and means for applying said derived pulses to said counter.

7. Apparatus for transmitting binary data as recited in claim 5 wherein said keyer circuit includes a first pair of input terminals to which said carrier wave is applied, first and second impedances connected in series across said first pair of input terminals, a pair of output terminals connected to the ends of said second impedance, a third impedance connected in parallel with said first and second impedance, a pair of second input terminals to which said selected output pulses are applied, an inoperative means connected across said third impedance which has an impedance value which is high when compared to its impedance value when rendered operative, and means for coupling said inoperative means to said second pair of input terminals to be rendered operative in the presence of said selected output pulses.

References Cited in the file of this patent

UNITED STATES PATENTS

| | | |
|---|---|---|
| 2,438,492 | Bascom et al. | Mar. 30, 1948 |
| 2,564,928 | Schmidt | Aug. 21, 1951 |